United States Patent
Marble et al.

[11] Patent Number: 6,018,291
[45] Date of Patent: Jan. 25, 2000

[54] MOTOR VEHICLE ANTI-THEFT SYSTEM BY RANDOM PROBLEM SIMULATION

[76] Inventors: Alan Dale Marble, 10829 Nix La., Whitehouse, Tex. 75791; Neal Bragg Reasoner, 1222 Johnson Dr., Ft. Worth, Tex. 76126

[21] Appl. No.: 09/090,613

[22] Filed: Jun. 4, 1998

[51] Int. Cl.$^7$ ................................................ B60R 25/10
[52] U.S. Cl. ................ 340/426; 340/425.5; 340/825.31; 307/10.2; 180/287
[58] Field of Search ................................ 340/425.5, 426, 340/428, 429, 430, 825.31, 825.32, 825.34; 307/10.1, 10.2, 9.1; 180/287

[56] References Cited

U.S. PATENT DOCUMENTS

| | | | |
|---|---|---|---|
| 4,452,197 | 6/1984 | Weber | 123/198 |
| 4,992,670 | 2/1991 | Pastor | 307/10.3 |
| 5,042,444 | 8/1991 | Hayes et al. | 123/335 |
| 5,307,048 | 4/1994 | Sonders | 340/426 |
| 5,444,430 | 8/1995 | McShane | 340/426 |
| 5,462,372 | 10/1995 | Mawyer, Sr. | 340/428 |
| 5,463,372 | 10/1995 | Mawyer, Sr. | 340/428 |
| 5,473,200 | 12/1995 | Woo | 307/10.2 |
| 5,486,806 | 1/1996 | Firari et al. | 340/426 |
| 5,513,244 | 4/1996 | Joao et al. | 340/425.5 |
| 5,534,845 | 7/1996 | Issa et al. | 340/425.5 |
| 5,539,377 | 7/1996 | Dillion | 340/426 |
| 5,559,491 | 9/1996 | Stadler | 340/426 |
| 5,596,317 | 1/1997 | Brinkmeyer et al. | 340/825.31 |
| 5,708,712 | 1/1998 | Brinkmeyer et al. | 380/23 |

*Primary Examiner*—Thomas Mullen
*Assistant Examiner*—Van T. Trieu

[57] ABSTRACT

An anti-theft vehicle subsystem disabling device including a digital controller and one or more remote receiving vehicle subsystem interface units for randomly simulating problematic vehicle behavior. The system determines user authorization based on keycode entry of either a master code or a programmable user code. Once authorized all vehicle subsystems under control operate normally. While authorized, the system also allows optional entry into a valet mode and constantly monitors a hidden anti-hijacking button. Any time unauthorized use is determined, the digital controller randomly generates a unique controlling signal with random timing variations that is communicated to the remote receiving subsystem interface units. These units can be connected in series with vital vehicle subsystem components in order to interfere with typical subsystem component operation, thereby inducing the illusion of an actual vehicle problem severe enough to inhibit vehicle driveability. This system allows unique implementation by locating disabling receivers on any variety of vital vehicle subsystems, presenting thieves with multiple unknowns specific to each vehicle. Due to this, in addition to the random nature of the device, there is no chance for a pattern to develop, and therefore very little possibility that the device will be recognized by an unauthorized operator.

16 Claims, 15 Drawing Sheets

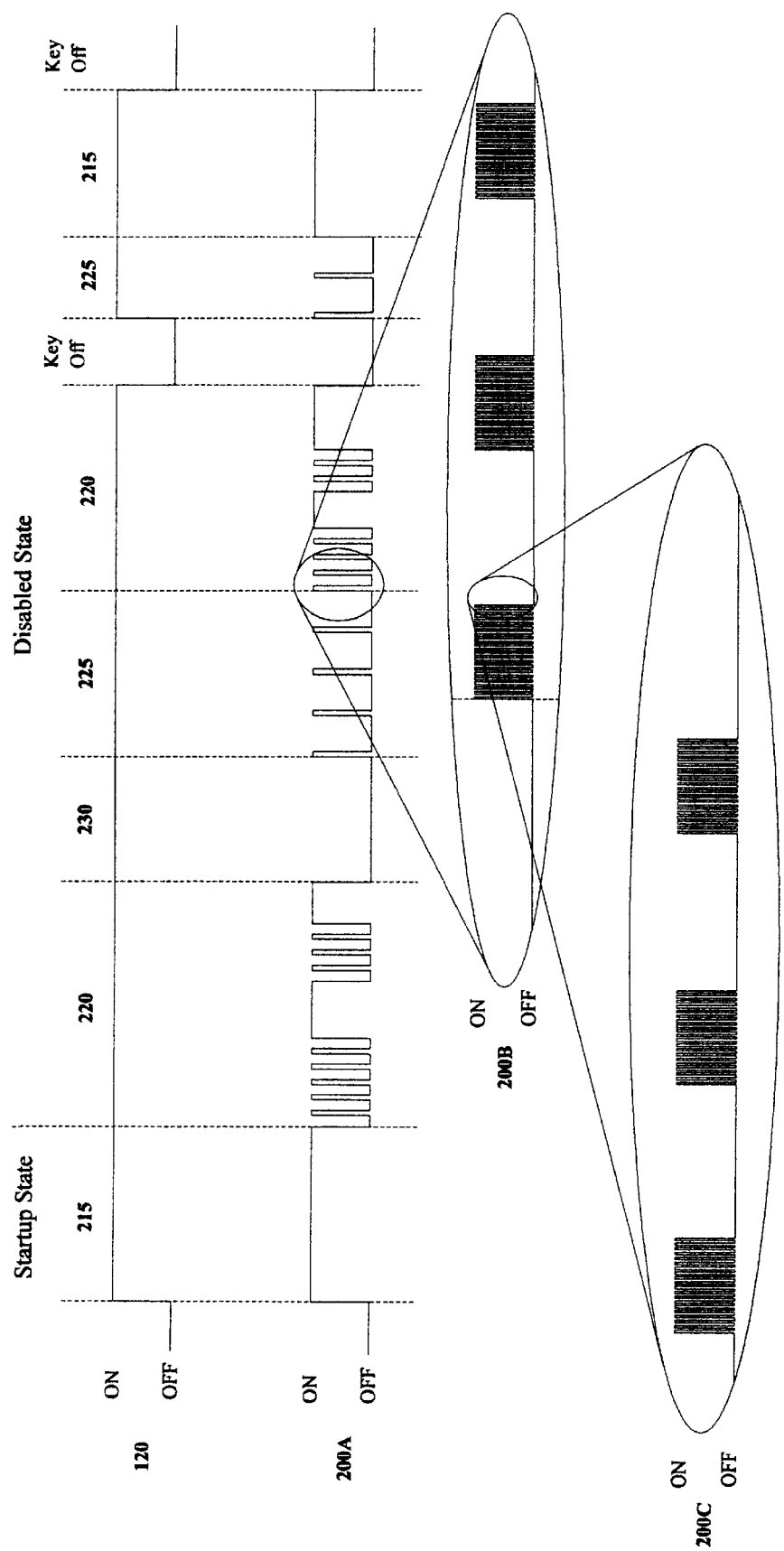

MOTOR VEHICLE ANTI-THEFT SYSTEM BY RANDOM PROBLEM SIMULATION

TECHNICAL FIELD OF THE INVENTION

The present invention relates to automotive anti-theft system equipment and, more specifically, relates to an apparatus and method for random problem simulation.

BACKGROUND OF THE INVENTION

There are many techniques in use to attempt to prevent unauthorized automobile use or theft. These techniques range from simple kill switches to elaborate computer controlled alarm and disabling systems. However, professional thieves study to be proficient at defeating the entire range of anti-theft techniques.

The simplest forms are the easiest to defeat. Keys can be reproduced and locks can be picked, or the thief can hot-wire the ignition system. If a hidden kill switch has been installed, it can also be located and easily bypassed. Hidden kill switches do not usually remain hidden long, due to mechanics and other users of the vehicle being told of the secret location.

At one time audible alarm systems were effective deterrents. This is no longer true because most people are conditioned to false alarms and simply ignore the audible alarms. Thieves recognize this and are no longer deterred. They know how to defeat the audible alarm before anyone becomes concerned. This type of system is only effective when the vehicle owner personally hears the alarm.

Vehicle disabling systems, such as fuel cutoff valves or ignition shut down circuits, are better alternatives. A professional thief can, however, defeat these types of systems. Most of these systems are very repeatable, and therefore become obvious to the thief. Once a thief is aware of the system, he can take appropriate action to defeat it.

Most theft deterrent systems have limited effectiveness. They are usually detectable and defeatable by a proficient thief. To be effective, a proper problem simulation system should be undetectable by the thief. It would appear to be a typical automotive problem, possessing related symptoms that recur unpredictably. It should also employ multiple symptoms related to a specific problem in a random fashion with each symptom having an associated probability of taking place. Each of the random symptoms should exist for some random duration of time before the next symptom, if any can occur.

PRIOR ART

As discussed in the background there are a number of methods to protect a motor vehicle against theft. Few of the many automotive theft-prevention patents detail allowing a vehicle to start and temporarily run before disabling a critical component, such as the fuel or ignition system.

U.S. Pat. No 5,486,806 describes a fuel flow restricting system. It allows the vehicle to run for a predetermined period of time, after which fuel flow is restricted to a small amount that limits the power the engine can provide. This is somewhat effective, but the time duration is very repeatable, which is a clue to the existence of a theft deterrent device.

An ignition disabler is described in U.S. Pat. No. 4,992,670. It allows the engine to start successfully, but disables it when the keyswitch is returned from the START position to the RUN position. This also confuses the thief initially, but the obvious pattern could be noticed and the device discovered.

In U.S. Pat. No. 5,463,372 the engine is allowed to run for a short period of time. An oscillating relay at a fixed frequency is used to interrupt the ignition system or EFI (Electronic Fuel Injection) system causing partial disablement. The time duration of this effect is adjustable by a variable resistor. This variation is set by the user and goes unnoticed by the thief. Once this sequence completes, total shutdown occurs and leaves the vehicle impaired for future start attempts. This system does not exhibit repeatable behavior. However, it is obviously not random due to the fact that it only occurs after the initial attempt to start the vehicle.

Described in U.S. Pat. No. 5,473,200 is a device that consists of a central control unit and one or more remote devices. The remote device(s) are configured such that they time out after a preset time-out period, unless they receive a signal from the central control unit. These remote receivers are on/off type devices with no random characteristics. This type of shut down sequence is not very confusing and the system could possibly be overcome by the thief.

U.S. Pat. No. 4,452,197 counts spark pulses of the ignition system. It can be configured to simply count a predetermined number of pulses, and then disable the vehicle. Optionally it can also intersperse alternating periods of spark inhibition and enablement to produce an illusion of engine misfiring before disablement. These periods are of a variable time duration that is defined by counting a fixed number of variable frequency spark pulses from the ignition control signal. Once again this variation is also set by the user and goes unnoticed by the thief. In either configuration, this system will produce a repetitive pattern that can be recognized by a potential thief.

The present state of the art does not exhibit random characteristics, and this is essential for properly simulating automotive problems. Most of the prior art is cyclic in nature but all have some form of repetition that could be detected by a knowledgeable thief. Once the device is detected, it becomes much more likely that the thief will locate and defeat it, gaining access to the "protected" vehicle. There is much less chance of this occurring if confusion is created by the device exhibiting random characteristics. A problem simulation system possessing random characteristics would appear to be very natural compared to most real life vehicle engine problems.

SUMMARY OF THE INVENTION

The present invention is a theft deterrent system that simulates problems in motor vehicles. Most vehicle problems are erratic and unpredictable, exhibiting random characteristics with no recognizable patterns. On engine startup, this device allows normal engine operation for a random time duration (greater than a predetermined minimum time) during which it can be deactivated. If it is not deactivated, it produces random problem simulation with random, erratic, and unpredictable effects similar to those of actual automotive ignition and fuel system problems. The device is not an alarm system, but can function well in conjunction with any alarm device. If a separate alarm is also on the vehicle, the two will function as backups to each other.

This system consists of several components coupled with motor vehicle subsystems. The heart of the system is the controller which supervises the entire system, communicating with one or more remote disabling receivers, which act as the interface circuitry between the controller and the motor vehicle subsystem. The controller performs verification of operator identification in addition to generation of random control information signals. A variety of methods can be used to generate the random control information signals, including receiving a radio frequency, using digital logic components, or programming a micro-controller, in order to provide a random control information signal. The functionality of the controller is based on the ignition keyswitch and anti-hijacking inputs, in addition to an input circuit. The keyswitch input simply monitors the switched battery voltage of the vehicle. The anti-hijacking button is mounted in a concealed convenient location. The input circuit could be a variety of devices, including a keypad, a voice recognition circuit, a magnetic strip, or any other common personal identification devices. A hard-wired keypad can be mounted in a convenient location (possibly hidden from view) to read in the access code. A remote keypad may also be attached to any convenient personal object and would function the same as the hard-wired keypad, in that an access code could be required rather than a single push-button enable/disable. The input circuitry could also generate a security code to accompany the operator identification. The controller would then require that the correct security code was present before allowing operator authorization. The remote disabling receivers (interface circuits) can be linked to the controller through a variety of methods, including infrared light, hard-wiring, radio frequency transmission, or any other electromagnetic connection. The disabling receivers could use either unidirectional or bidirectional communications, and be linked to the controller individually or through a common wiring bus. The controller could also generate a security code to accompany the random control information signal. The interface circuit would then require that the correct security code was present before allowing vehicle subsystem operation. The output of the remote disabling receivers are wired in series with the individual vehicle subsystems to be disabled. By disabling more than one subsystem of the vehicle, it can still be protected if by chance one of the disabling receivers is located and defeated. These receivers act as normally open switching devices that are controlled by the system controller. If power is removed from any part of this system, the vehicle will be inoperative.

When the vehicle is started, the device allows normal engine operation for some predetermined minimum time in addition to a random time period. If valid operator identification is entered during this time, the device continues to allow normal engine operation indefinitely. This is confirmed by an audible signal. Otherwise it repetitively randomly determines a symptomatic mode to exhibit until a reset signal is detected or a variable duration time-out has elapsed. The symptomatic modes consist of the signal types of run, stutter, severely impaired, and off. The run mode consists of a random (not exceeding a predetermined maximum) duration period of normal engine operation. This mode occurs very seldomly after initial startup. The stutter mode consists of very rough engine operation and significantly decreased horsepower. The duration and specific timing of this sequence are both random. The severely impaired mode consists of a random duration period which severely impairs the engine beyond the ability to continue running, yet still exhibiting signs of potential operation with random characteristics. This prevents the engine from running yet makes the problem hard to diagnose. The off mode completely disables the vehicle subsystem under control for a random time duration. If an attempt is made to restart the vehicle (with or without first switching the key off) the device will continue to randomly determine which of the symptomatic modes to exhibit. By creating so many random elements there is no chance for a pattern to develop, and therefore very little possibility that the device will be recognized by an unauthorized operator.

An added feature is programming mode, which allows the programming of a user access code. Within a predetermined time after the system has been enabled, the owner can use the keypad to optionally change the user access code. This feature is useful to ensure the master access code remains confidential. A temporary change of the user access code can secure against mechanics or other temporary users of the vehicle. A simple code change afterward regains total security.

Another feature is the valet mode. During this mode of operation the valet attendant has a limited number of start attempts and sufficient time in each to allow for parking or returning the vehicle. Upon return of the vehicle the owner can simply exit valet mode and return to a fully enabled state. If a timeout period elapses in any start attempt during valet mode, the vehicle begins the problem simulation mode of operation.

An anti-hijacking mode is included, which allows an anti-hijacking button hidden under the carpet to inform the controller that the vehicle has been hijacked. When this button has been pressed normal engine operation continues for a short period of time, after which the problem simulation mode is entered. This allows the thief a short getaway to keep him/her a safe distance from the owner.

This system allows flexibility in that the user can define a custom implementation by locating disabling receivers on any one or more vital vehicle subsystem(s). This means that every system becomes unique, and thieves are faced with unknowns on every vehicle with this device. This, in addition to the random nature of the device, results in a highly secured vehicle protection system.

BRIEF DESCRIPTION OF THE DRAWINGS

FIG. 5A depicts a possible timing diagram for the problem simulation stuttered signal used in the system.

DESCRIPTION OF THE PREFERRED EMBODIMENT

Figure 1A:
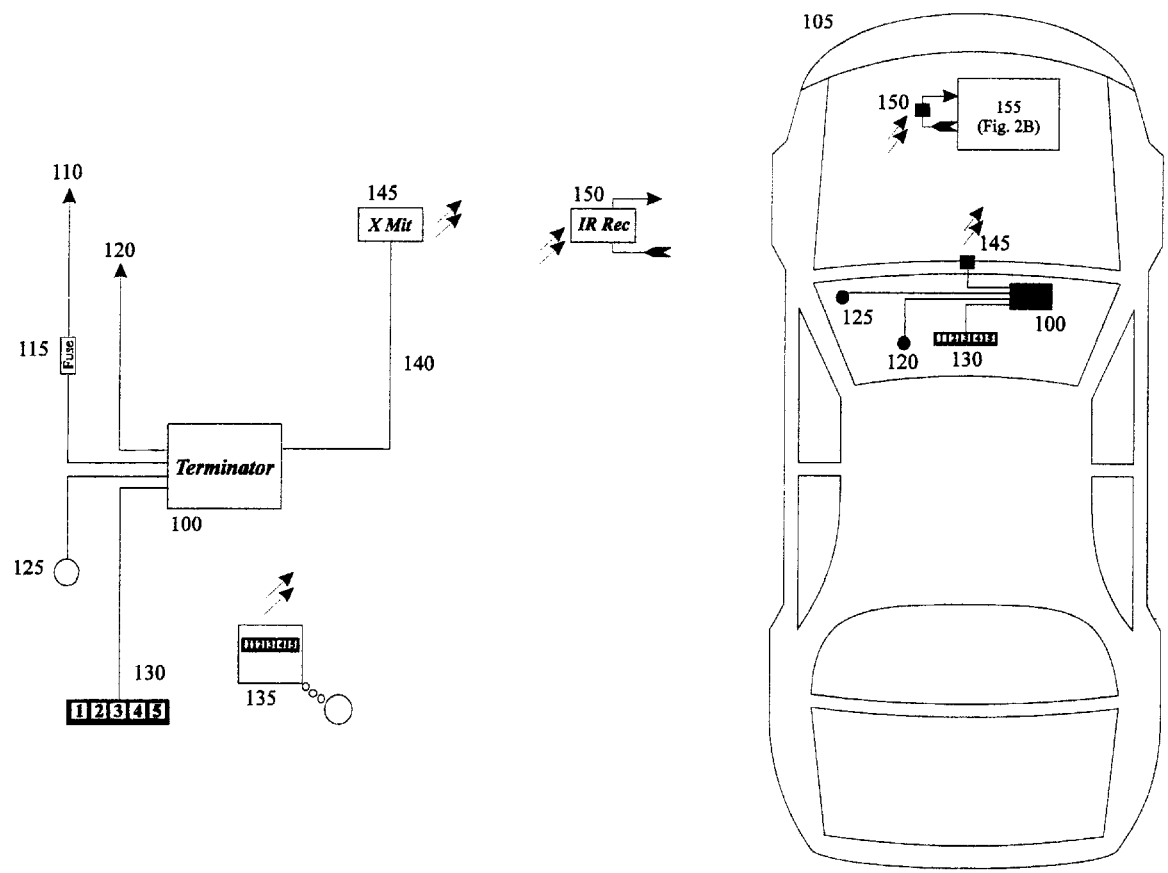
FIG. 1A illustrates a block diagram of a minimal system configuration using an infrared transmitter and receiver to implement stutter/enabled vehicle subsystem control and shows component placement within the vehicle.
Figure 1B:
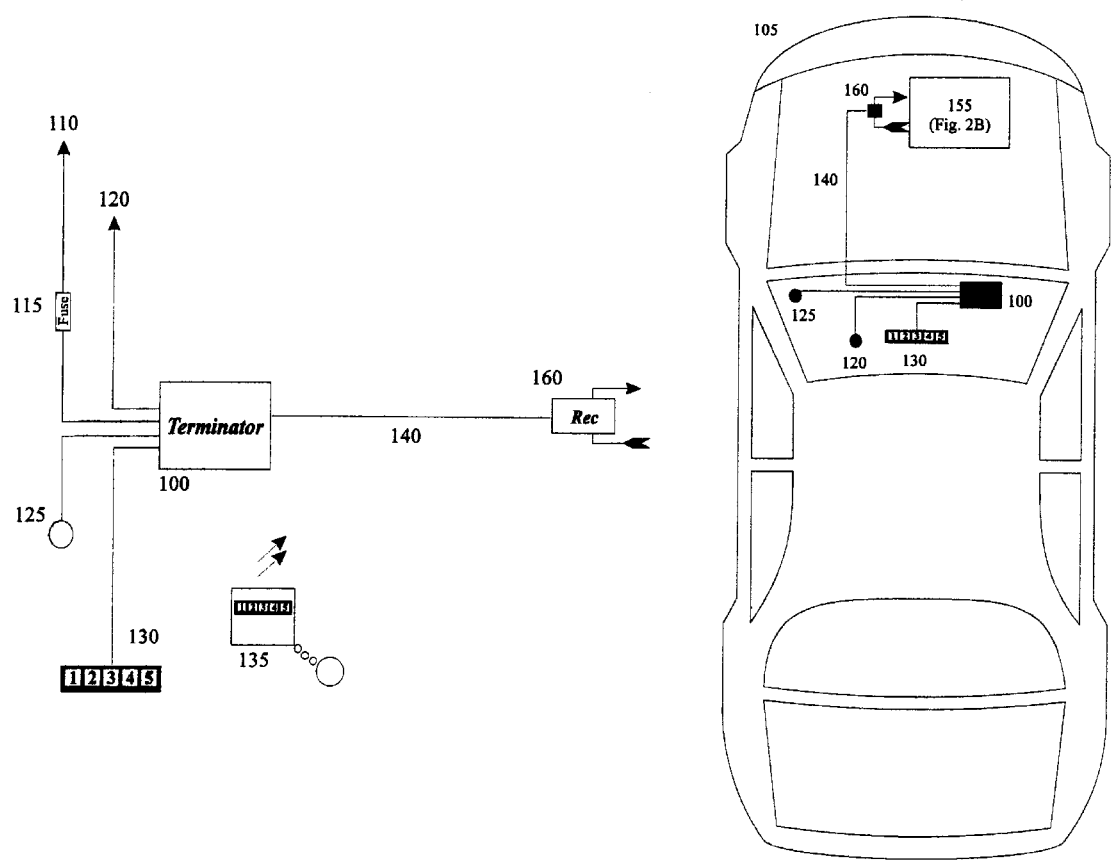
FIG. 1B illustrates a block diagram of a minimal system configuration using a hard wired receiver to implement stutter/enabled vehicle subsystem control and shows component placement within the vehicle.
Figure 1C:
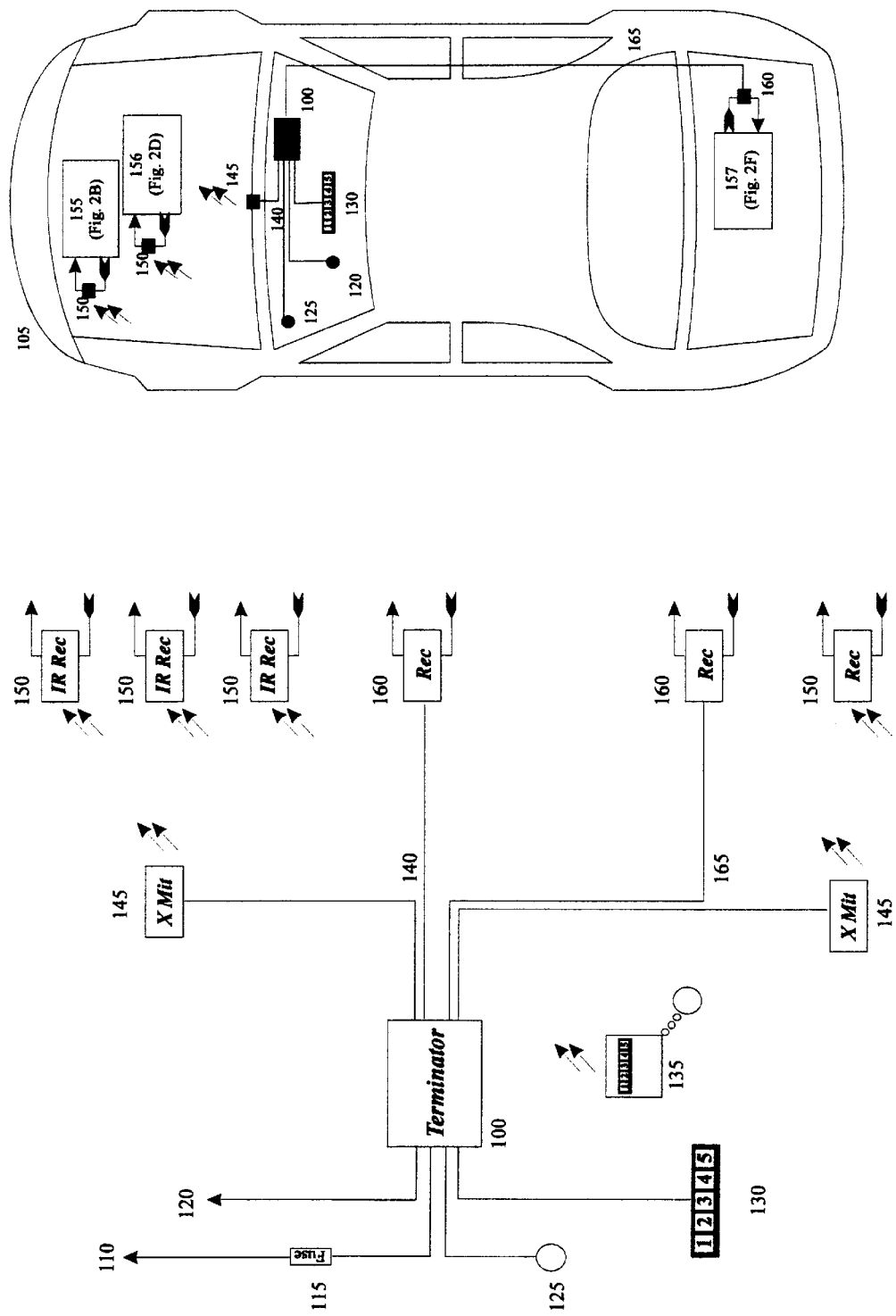
FIG. 1C illustrates a block diagram of a more expanded system configuration including two different types of vehicle subsystem control (both stuttered and switched) using a combination of both hard wired and infrared receivers.
Figure 2A:
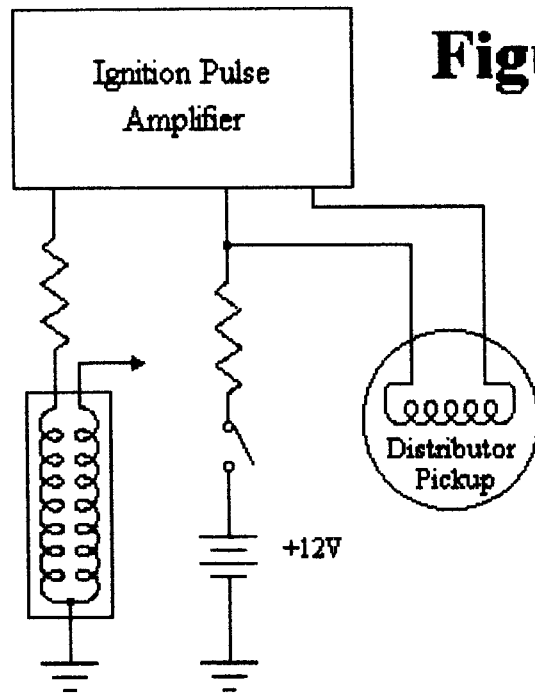
FIG. 2A depicts a typical electronic ignition system.
Figure 2B:
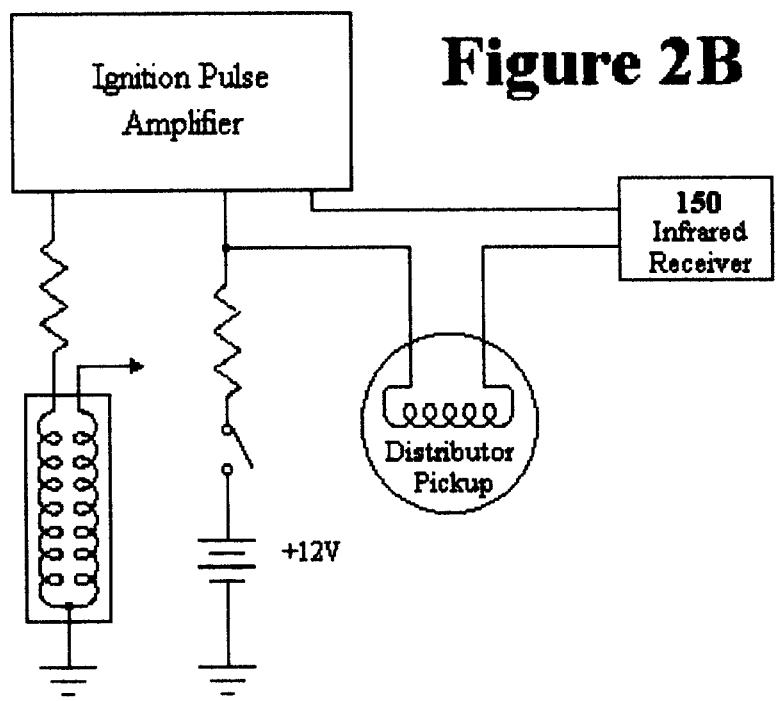
FIG. 2B depicts a typical electronic ignition system modified with the present invention.
Figure 2C:
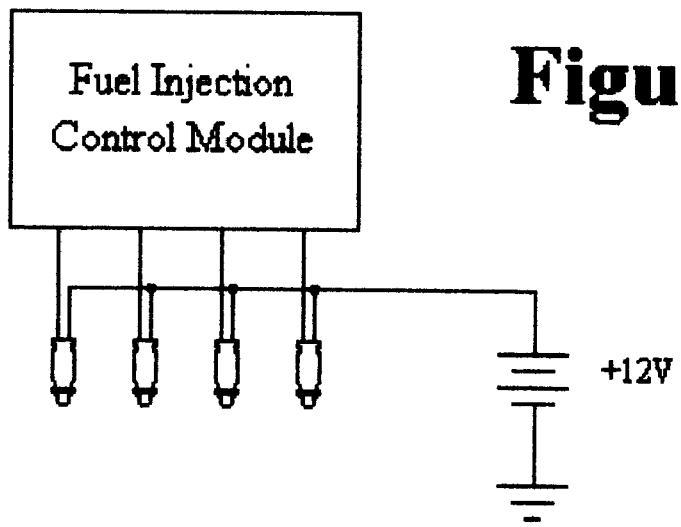
FIG. 2C depicts a typical electronic fuel injection system.
Figure 2D:
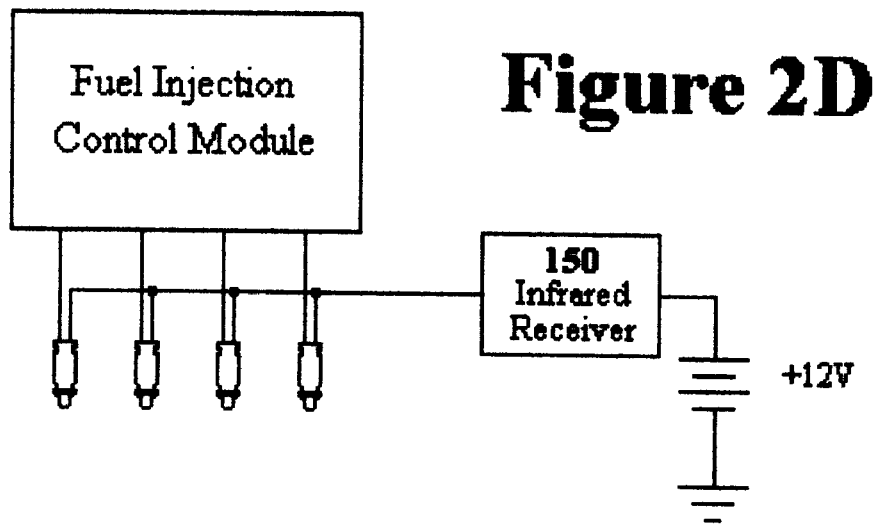
FIG. 2D depicts a typical electronic fuel injection system modified with the present invention.
Figure 2E:
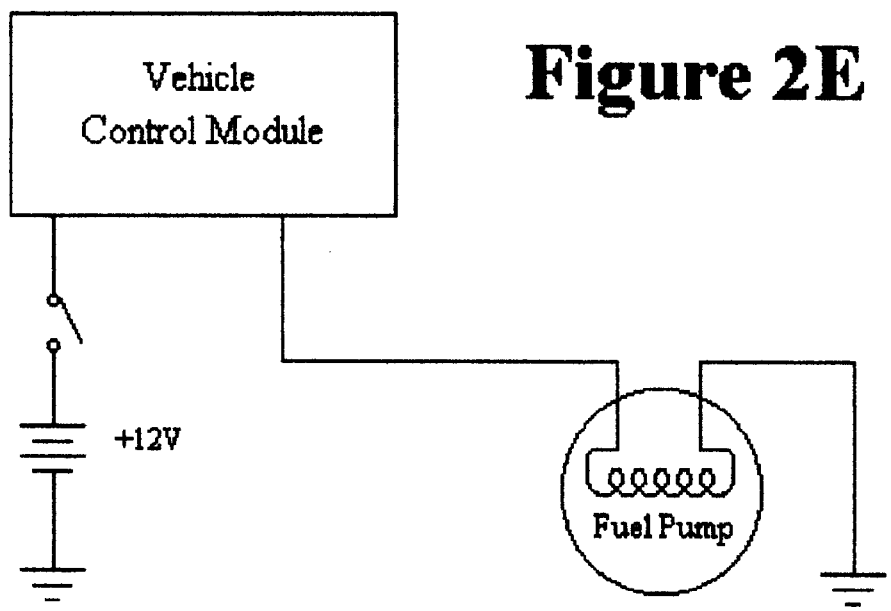
FIG. 2E depicts a typical electronic fuel pump system.
Figure 2F:
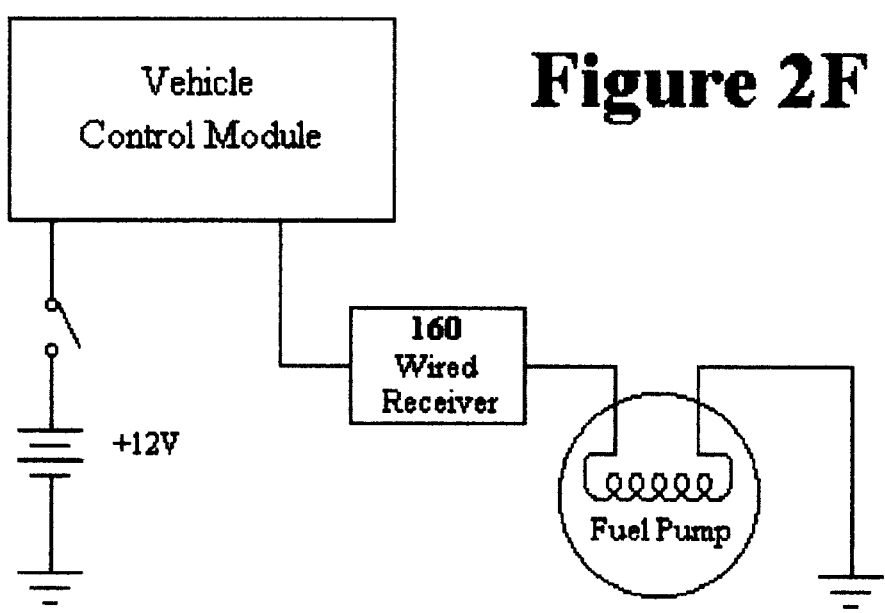
FIG. 2F depicts a typical electronic fuel pump system modified with the present invention.

FIG. 1A depicts a block diagram of a minimal system configuration for the present invention. The system controller 100, located in the interior of the motor vehicle 105, is connected to vehicle battery voltage 110 through fuse 115. The controller 100 monitors inputs from the vehicle ignition switch 120, an anti-hijacking button 125, and a numeric keypad 130, and possibly a wireless remote keypad 135. The controller 100 outputs a signal on output group 140 which is either a stuttered or enabled signal, depending on the state of the device. The signal is then transmitted by the infrared transmitter 145. This transmitted signal is then received by an infrared receiver 150 which is connected in series with a vital vehicle subsystem, such as the ignition system 155 depicted in FIGS. 2A and 2B, the fuel injection system 156 depicted in FIGS. 2C and 2D, or the fuel pump system 157 depicted in FIGS. 2E and 2F. Shown in FIG. 1B is a similar system modified from FIG. 1A excluding the infrared transmitter 145 and replacing the infrared receiver 150 with a wired receiver 160 connected directly between the controller 100 and a vital vehicle subsystem. FIG. 1C displays a more expanded block diagram of said system in FIGS. 1A and 1B. FIG. 1C includes multiple receivers, both wired 160 and infrared 150, each connected in series with an associated vehicle subsystem component and receiving a signal from either output group 140 or output group 165 from the controller 100. As stated earlier, the signal on output group 140 is either a stuttered or enabled signal, depending on the state of the device. Similarly, the signal on output group 165 is either a switched or enabled signal, depending on the state of the device. The type of vehicle subsystem under control determines which type of signal output should be connected through each receiver. The signal of output group 140 could be connected to any low power vehicle subsystem component such as an ignition pickup coil as depicted in FIGS. 2A and 2B, an ignition coil, a crank sensor, any other source of ignition sync pulses, fuel injectors as depicted in FIGS. 2C and 2D, automatic shutdown relays, or various computer signals. The signal of output group 165 could be connected to any other low power vehicle subsystem component including fuel pickup sensors, fuel pumps as depicted in FIGS. 2E and 2F, fuel valves, manifold absolute pressure sensors, or any other automotive computer sensor which would result in impaired engine operation. The system is thereby versatile enough to function well in any configuration with most vehicle subsystems in existence. Expanding the system should be trivial to those skilled in the art, however, for the purposes of this description, the focus will be on controlling a single subsystem.

Figure 3:
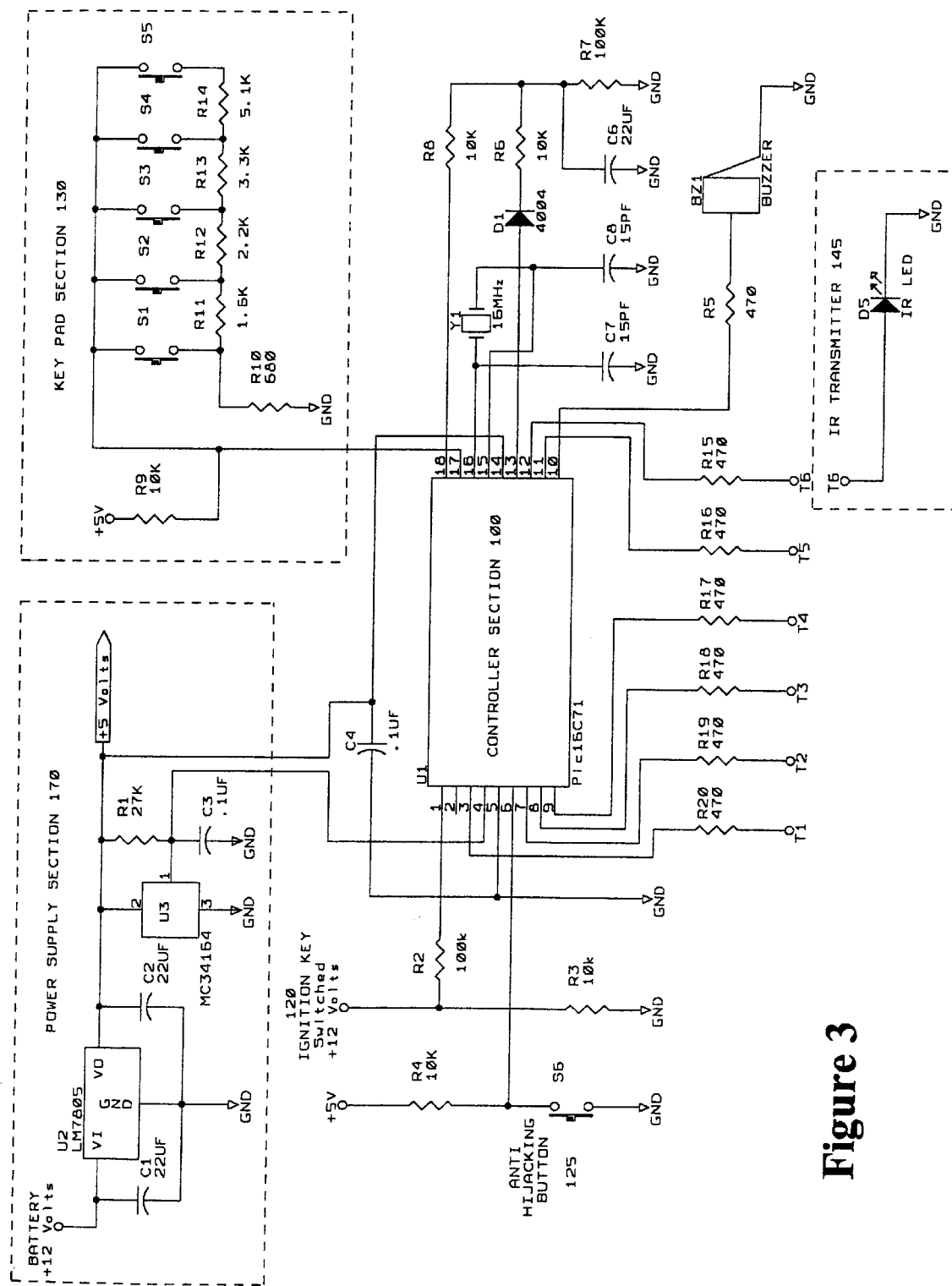
FIG. 3 shows a schematic diagram of the system controller and associated user input devices.

The battery voltage 110 is connected through fuse 115 to the power supply section 170 of the controller 100 circuit schematic diagram exhibited in FIG. 3. The power supply 170 consists of a filter capacitor C1 connected to the input of a 5 volt monolithic regulator U2. Capacitor C2 serves to filter the 5 volt output of regulator U2. This provides the regulated 5 volt supply for the controller 100 circuitry. Supply voltage monitor U3, resistor R1, and capacitor C3 comprise a reset circuit that ensures proper operating voltage for the microcontroller U1.

The microcontroller U1 is a PIC16C71 single-chip device which contains a microprocessor, random access memory (RAM), electronically programmable read only memory (EPROM), analog to digital converters, and digital input/output circuitry, therefore little external support circuitry is necessary. Crystal Y1 in addition to capacitors C7 and C8 provide the necessary oscillator circuit for the microcontroller U1. If the device becomes enabled (which will be defined in detail later) then a digital output pin is driven to a logic high level. This logic high is coupled through diode D1 and resistor R6 to charge a time delay circuit defined by capacitor C6 and resistor R7. The output of the time delay circuit returns to an analog input pin on microcontroller U1 through resistor R8. This circuitry allows the microcontroller to continue an enabled state of operation if any short duration glitch occurs and causes a system reset. Glitch detection occurs at the time of power up by the microcontroller U1 reading the amount of charge on the time delay circuit consisting of capacitor C6 and resistor R7. If the amount of charge on capacitor C6 is above a predetermined value then microcontroller U1 re-enables itself to its previous state.

Resistor R3 pulls an input pin on the microcontroller U1 to a logic low level while the vehicle ignition switch 120 is in the OFF position. While in the ON position, the vehicle ignition switch 120 pulls the pin to a logic high level through resistor R2 informing the microcontroller U1 that operation of the vehicle is being attempted. The numeric keypad section 130 comprises a set of five normally open pushbuttons, S1 through S5. They are all connected through resistor R9 to the regulated 5 volt supply and to the microcontroller U1 through a resistive ladder network consisting of resistors R10 through R14. For each individual pushbutton pressed, this produces a unique voltage on an analog input pin of microcontroller U1, allowing the interpretation of various system control codes. Control codes such as valet mode, programming mode, and operator identification are confirmed to the operator by audible beeps, generated by microcontroller U1 outputting a 3 kilohertz square wave through resistor R5 and into buzzer BZ1.

The microcontroller U1 is capable of generating multiple random control information signals to control the various vehicle subsystems. There are several output pins for this, which are divided into two separate groups. If the device has been enabled, both groups output an enabled signal 210 of FIG. 5C. If the device has not been enabled, problem simulation occurs and both groups output their respective signals. One set of pins, output group 140, outputs a complex waveform called the stuttered signal 200 of FIG. 5A. The other set of pins, output group 165, outputs a signal derived from the stuttered signal 200 which is called the switched signal 205 of FIG. 5B. These two signals will be described in more detail later. These signals are each communicated through current limiting resistors R15 through R20 and coupled to the interface circuit through terminal connections T1 through T6. The interface circuit consists of either directly connecting to the wired receiver 160 or to an infrared transmitter 145 which transmits the random control information signal to the infrared receiver 150. The infrared transmitter 145 passes the signal through LED D5 to be transmitted via infrared light to the infrared receiver 150. If the device is in the enabled state, microcontroller U1 monitors the anti-hijacking circuitry, which consists of push-button S6. This anti-hijacking input is pulled to a logic high level by resistor R4, and pulled to a logic low level if push-button S6 is depressed. The depression of push-button S6 allows the vehicle operator to inform the microcontroller U1 that a hijacking has occurred.

Figure 5B:
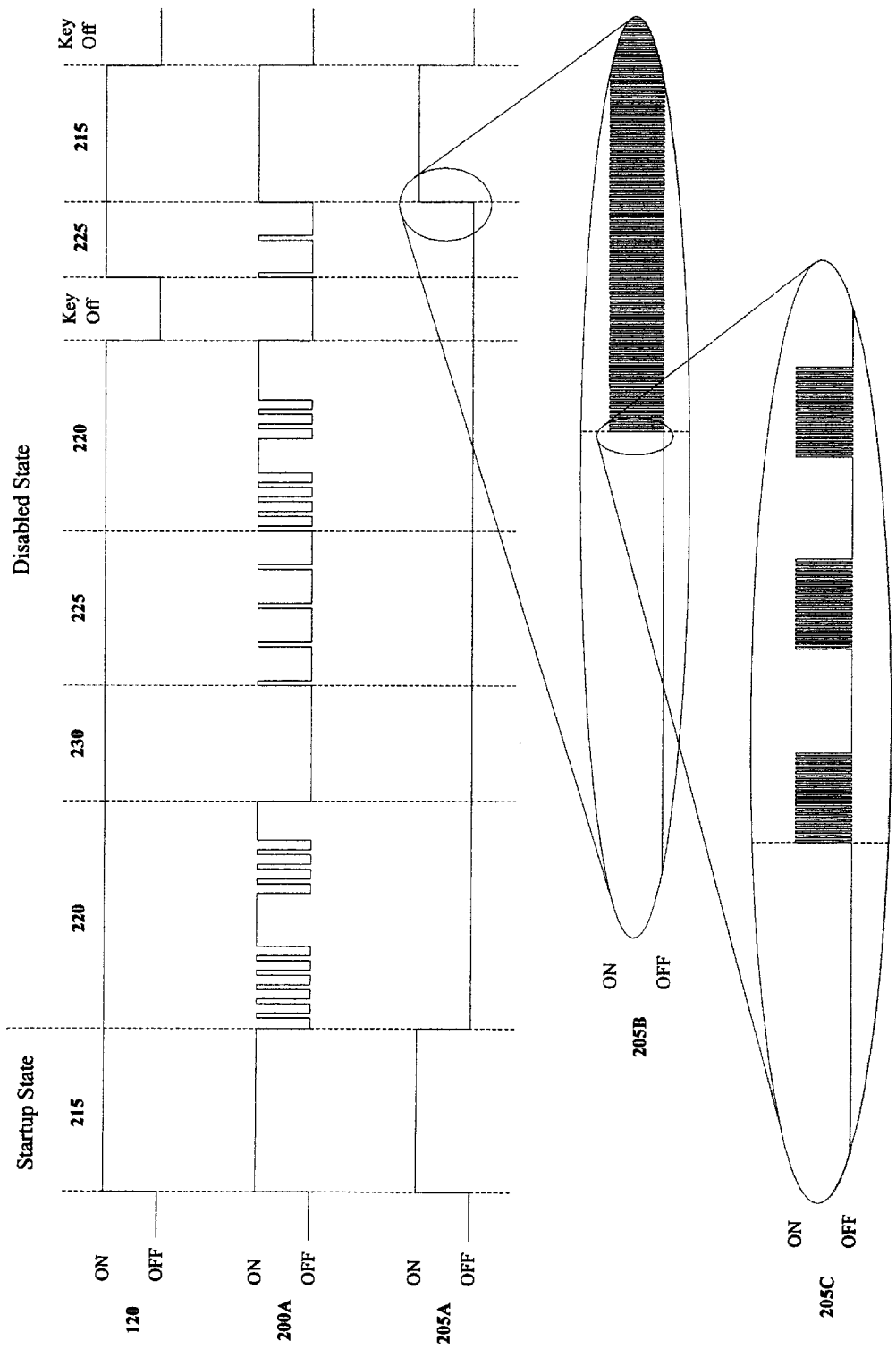
FIG. 5B depicts a possible timing diagram for the problem simulation switched signal used in the system.
Figure 5C:
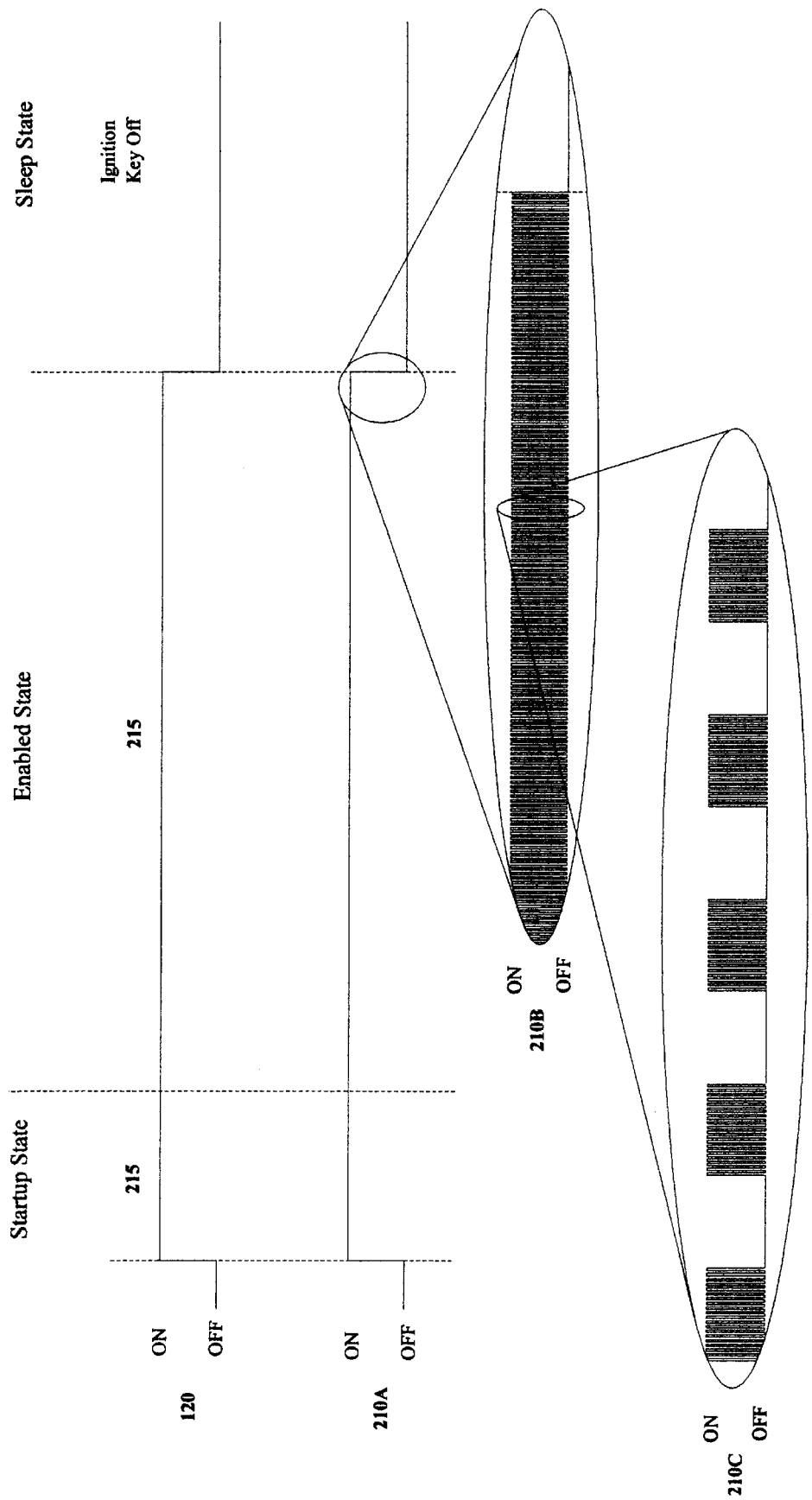
FIG. 5C depicts the timing diagram for the enabled signal used in the system.

FIG. 5A through 5C depict the waveforms of the random control information signals, the stuttered signal 200, the switched signal 205, and the enabled signal 210. These provide the means for communication between the controller 100 and various receivers, either infrared 150 or wired 160. The stuttered signal 200 of FIG. 5A can be transmitted on output group 140, and is composed of random control information 200A modulated by a 3 kHz frequency and modulated again by a 40 kHz frequency. The random control information 200A consists of several signal types randomly arranged in order to produce the problem simulation effects in the vehicle subsystem. These signal types are run 215, stutter 220, severely impaired 225, and off 230 which correspond to the symptomatic modes of random duration mentioned in the summary. The run signal type 215 is simply a continuous logic high signal for the chosen duration. The stutter signal type 220 consists of two states which follow each other in a repetitive order for a random number of cycles. The first state is of random duration during which the signal is always in a logic high state. The second state is also of random duration during which the signal is switched to a logic high state for 25 milliseconds and a logic low state for 50 milliseconds repeatedly. The severely impaired signal type 225 is defined as the signal being switched to a logic high state for 25 milliseconds and then a logic low state for 175 milliseconds repeatedly for the chosen duration. The off signal type 230 is simply a continuous logic low signal for the chosen duration. Before the random control information 200A is actually communicated to the receivers it is modulated by a 3 kHz frequency. The resulting modulated signal is depicted as 200B, which has been magnified from 200A. This signal 200B is modulated again by a 40 kHz frequency. This modulation is depicted as 200C, which has been magnified again from 200B. The result of the random control information 200A modulated by both the 3 kHz and 40 kHz frequencies is the actual stuttered signal 200 that is communicated on the output group 140 to control the vehicle subsystem. The switched signal 205 of FIG. 5B can be communicated on output group 165, and is similarly composed of random control information 205A modulated by a 3 kHz frequency and modulated again by a 40 kHz frequency. The random control information 205A is derived from the stuttered signal's random control information 200A. Any time the stuttered signal's control information 200A exhibits the run signal type 215, the switched signal's control information 205A will also exhibit a run signal type 215. During any other signal type of the stuttered signal's control information 200A, the switched signal's control information 205A will exhibit an off signal type 230. Just as in the case of the stuttered signal 200, the random control information 205A is modulated by a 3 kHz frequency and magnified in 205B. This signal 205B is modulated again by a 40 kHz frequency and magnified in 205C. The result of the random control information 205A modulated by both the 3 kHz and 40 kHz frequencies is the actual switched signal 205 that is communicated on the output group 165 to control the vehicle subsystem. The enabled signal 210 of FIG. 5C can be communicated on both output groups 140 and 165, and is simply composed of a logic high signal as the control information 210A modulated by a 3 kHz frequency and magnified in 210B. This signal 210B is modulated again by a 40 kHz frequency and magnified in 210C.

Figure 4A:
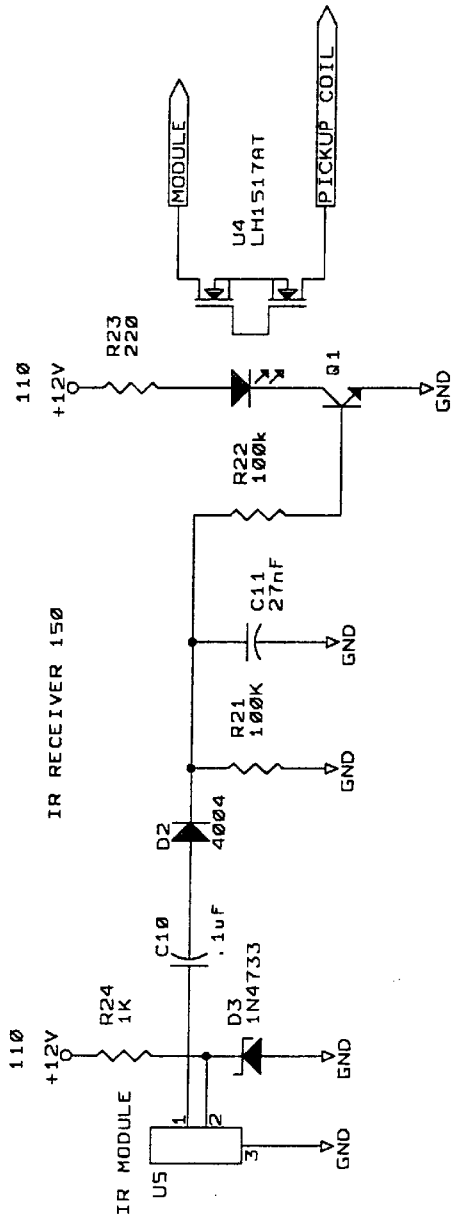
FIG. 4A shows a schematic diagram of an infrared receiver.
Figure 4B:
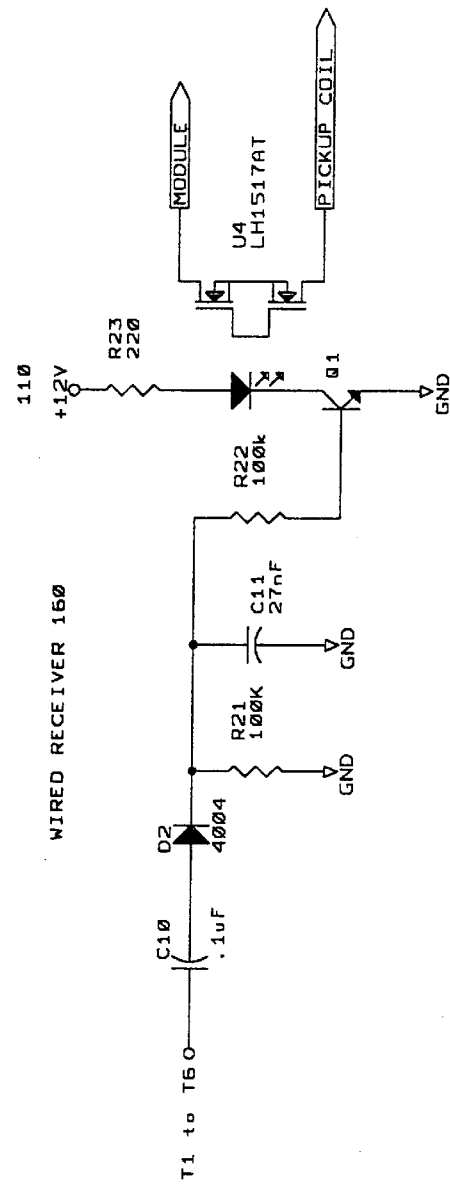
FIG. 4B shows a schematic diagram of a hard wired receiver.

The infrared receiver 150, shown in FIG. 4A, consists of an infrared module U5 which receives infrared signal information from the infrared transmitter 145. The infrared module U5 is powered by a 5 volt supply consisting of resistor R23 connected between vehicle battery voltage 110 and zener diode D3. The received infrared signal information depends on the wiring connections with the controller, and can be any one of either the stuttered signal 200 of FIG. 5A, the switched signal 205 of FIG. 5B, the enabled signal 210 of FIG. 5C, or no signal. The 40 kHz frequency contained in these signals is necessary in order for the infrared module U5 to pass any signal. The infrared module U5 removes the 40 kHz frequency and passes the remaining 3 kHz frequency and control information signal to capacitor C10. In the wired receiver 160, shown in FIG. 4B, capacitor C10 is connected through wiring directly to any one of terminals T1 through T6 of the controller 100 depicted in FIG. 3 and therefore still contains the 40 kHz frequency. From capacitor C10 the remaining circuitry of FIGS. 4A and 4B is the same for both the wired receiver 160 and the infrared receiver 150. In both circuits, capacitor C10 passes only pulsating signals (like the random control information signals), thereby preventing a bypass connection to either vehicle battery voltage 110 or vehicle ground. In either receiver, the pulsating signal is then passed through diode D2 to resistor R21 and capacitor C11 which provide envelope detection filtering. This filtering effectively removes the 3 kHz frequency, and also the 40 kHz frequency (which would still be present only in the wired receiver) from the signal leaving only the control information. This information passes through resistor R22 to the base of transistor Q1 which switches the solid state relay U4 through current limiting resistor R23, based on the control information. The normally open terminals of the solid state relay U4 are then connected in series with the vehicle subsystem under control, thereby allowing random control of its functionality which impairs the vehicle.

In describing the microcontroller U1 software, references are made to the hardware and timing signals of FIGS. 2 through 5. In order to allow for precise timing of the control signals, a software interrupt routine has been implemented. The interrupt routine occurs every 12.5 microseconds and toggles an output buffer that may or may not be coupled to the microcontroller U1 pins of output groups 140 and 165. Toggling this buffer on for 12.5 microseconds and then off for another 12.5 microseconds generates a 40 kHz square-wave frequency. A 3 kHz frequency is derived from this 40 kHz frequency, and is used to control this toggling of the 40 kHz frequency to the output buffer. This results in a signal in the output buffer which is a 3 kHz frequency modulated by a 40 kHz frequency. Two counters are used throughout the problem simulation code to determine the enabling or disabling of the coupling of the buffer to the output groups 140 and 165. The time periods of these two counters are one fifth of a second and one fortieth of a second. These counters are derived from the specific timing of the interrupt. Every 12.5 microseconds execution of the main line code is briefly interrupted by this routine, therefore no matter what process the main line code is performing, accurate timing is maintained.

Figure 6A:
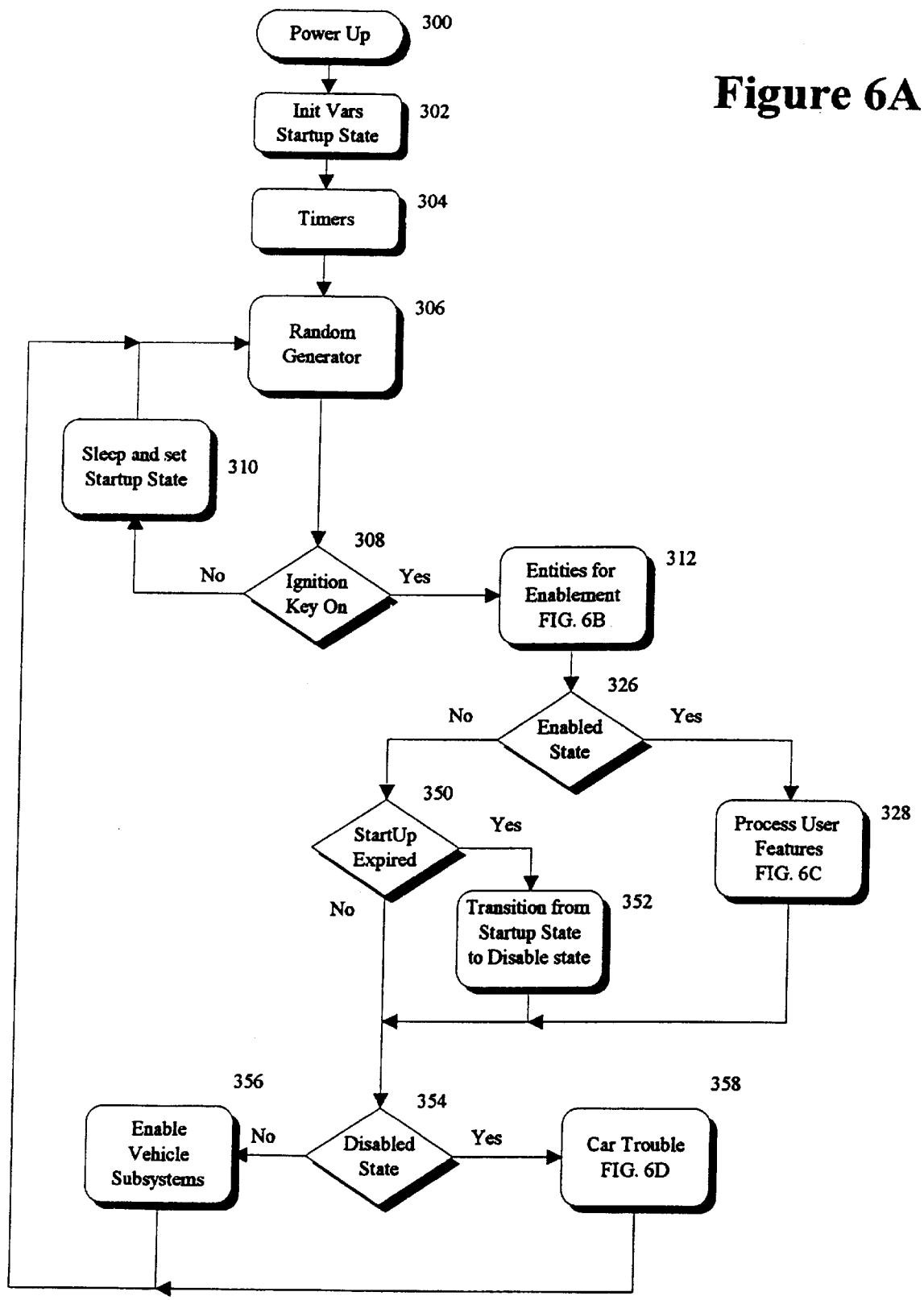
FIG. 6A is a top level flow chart of the system software showing an overview of the code execution sequence.
Figure 6B:
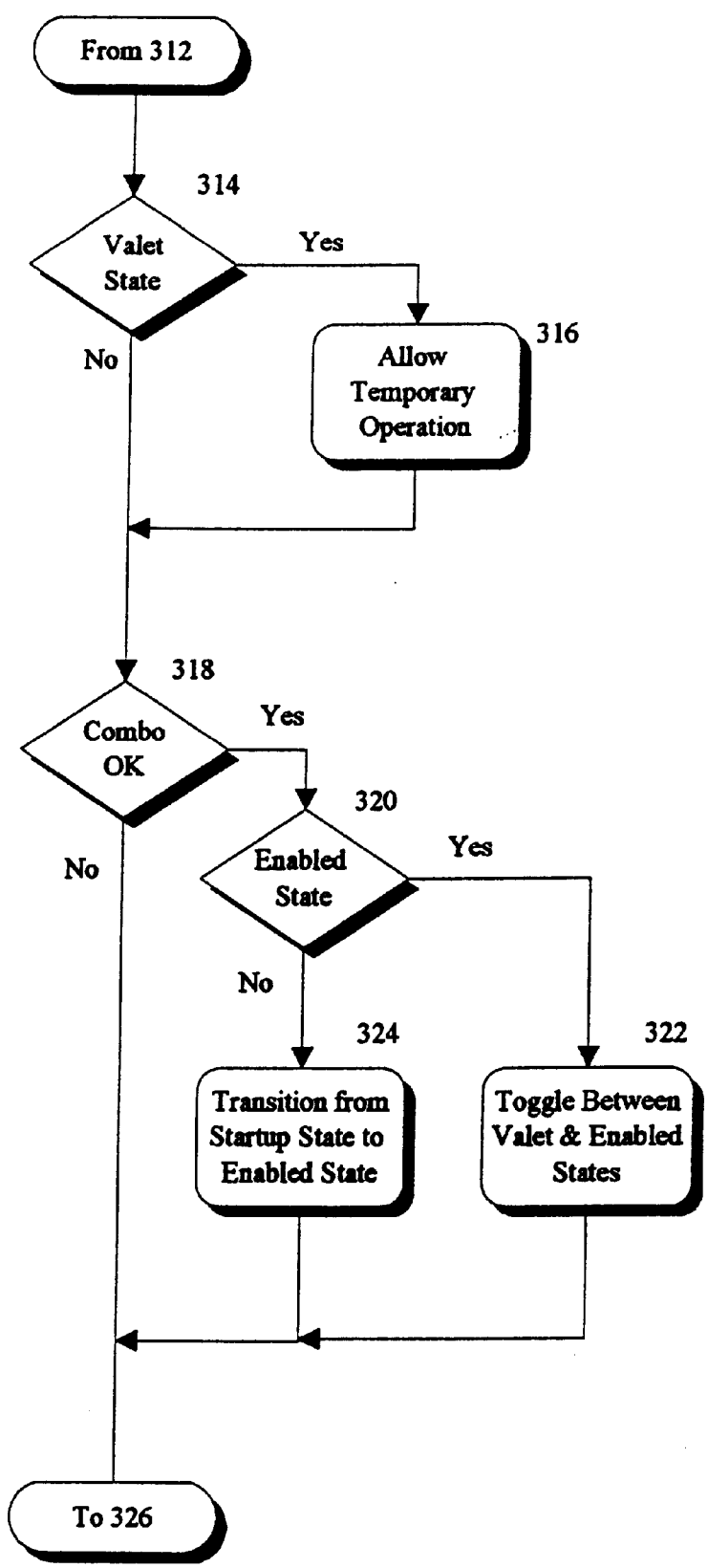
FIG. 6B is an expansion of the top level flow chart detailing the entities for enablement.

A top level view of the microcontroller U1 software is graphically represented in FIG. 6A. Code execution begins with device power up in step 300. This occurs only when battery voltage 110 is applied to the device, such as during installation. Initialization of the code variables and the registers of microcontroller U1 occur next in step 302. Following this, step 304 provides a power up timer which delays device operation for a predetermined time interval. This further frustrates an unauthorized user if the device is located and tampered with. Step 306 begins the looping of the main line code, which is executed repetitively while battery voltage 110 is applied to the device. A new random number is generated every time the loop executes. Every time a random number is generated the previous random value is used as the seed for the new random number, therefore this serves to keep the system more random. After this step 308 checks the vehicle ignition switch 120. If the ignition switch is in the OFF position, the timing interrupt is disabled, and the device enters a sleep state during step 310 in order to conserve battery power. The sleep state relies on an internal watchdog timer to time-out and continue subsequent code execution. At this point the system enters the startup state and the code returns to the beginning of the main loop of step 306. If the ignition switch is in the ON position during step 308, then the device enters step 312, which is detailed in FIG. 6B.

The system is checked to see if the valet mode is active, which is indicated by the valet flag, in step 314. If the device is in the valet mode, then the enabled signal 210 is sent to the output buffers and is coupled to output pin groups 140 and 165 of the controller allowing vehicle subsystem operation in step 316. If the device is not in the valet mode then the vehicle subsystem is not allowed to operate. In either case code execution continues in step 318. The keypad 130 (which is also used as the valet input, and is the only valet circuitry necessary) is scanned for a single keypress and the five most recent keypresses are compared to both the master code (which is factory programmed) and the user code (which is programmed by the user) each time step 318 occurs. If the accumulated keypresses do not match either code, then code execution returns to FIG. 6A at step 326. If the accumulated keypresses match one of the five digit access codes then the system is checked to see if it is already in the enabled state in step 320. If the system is not in the enabled state then step 324 changes the system to the enabled state and confirms authorized operator identification entry to the user by an audible signal. The enabled state allows the enabled signal 210 to be sent to the output buffers and is coupled to output pin groups 140 and 165 of the controller allowing vehicle subsystem operation. All vehicle subsystems remain under enabled control until the vehicle ignition switch 120 is switched to the OFF position. If the system is in the enabled state during step 320 then code execution continues to step 322 where toggling between the valet mode and the enabled state occurs. This occurs anytime the user reenters the access code and is confirmed by an audible signal. The valet mode allows multiple restarts (up to a predetermined maximum) of the vehicle and allows it to operate fully until a predetermined maximum interval of time for each restart has expired, as determined by the valet timer. If this time interval expires during any valet mode operation, no more restarts will be allowed. Toggling back to the enabled state is also confirmed by an audible signal, and will not allow any restarts once the vehicle ignition switch 120 is returned to the OFF position. Once the system state has been toggled, code execution continues on FIG. 6A in step 326.

Figure 6C:
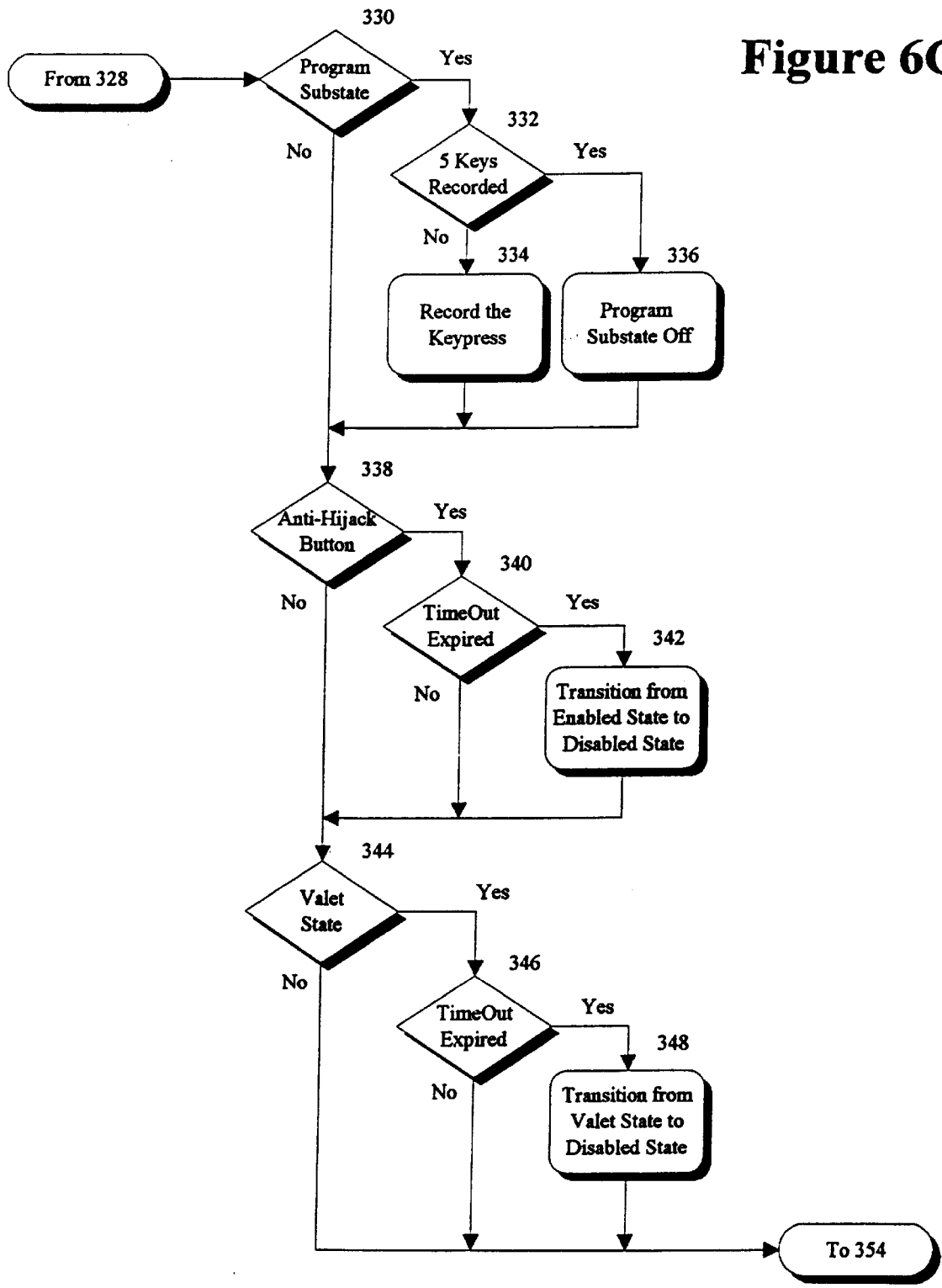
FIG. 6C is an expansion of the top level flow chart detailing the processing of the user features.

At this point, step 326 determines whether the system is in the enabled state. If the system is in the enabled state, then processing of the feature states occurs in step 328. This includes processing for the programming mode, the anti-hijacking mode, and the valet mode, and is depicted in detail in FIG. 6C.

During the first five seconds of the enabled state, step 330 allows the device to enter the programming mode upon entry of a predefined key sequence, which allows programming of the temporary user access code. The programming circuitry also consists simply of a programming input, which is also the keypad 130. This option is only available if the master access code was used to enable the system. If the programming mode has been entered (which is indicated by the programming flag), then step 332 checks to see if five keypresses have been recorded. If not, then step 334 attempts to record a keypress each time the main loop scans through this step. If five keypresses have been recorded or a programming mode time-out occurs then step 336 exits the programming mode, leaving the system in the enabled state. Step 338 occurs next regardless of what occurred in steps 330 through 336. The anti-hijacking button 125, which comprises the anti-hijacking circuitry, is checked in step 338. If the anti-hijacking input is pressed, then the device enters the anti-hijacking mode (indicated by the anti-hijacking flag). Once the device is in the anti-hijacking mode step 340 checks the anti-hijacking timer for a predetermined time-out period. If this period has elapsed, then step 342 places the system in the disabled state. Step 344 occurs next regardless of the path through steps 338 through 342. Step 344 checks to see if the device is in the valet mode. If the device is in the valet mode step 346 checks a timer for a predetermined time-out period. If this period has elapsed, then step 348 places the system in the disabled state. Step 354 of FIG. 6A occurs next regardless of the path through steps 344 through 348.

Figure 6D:
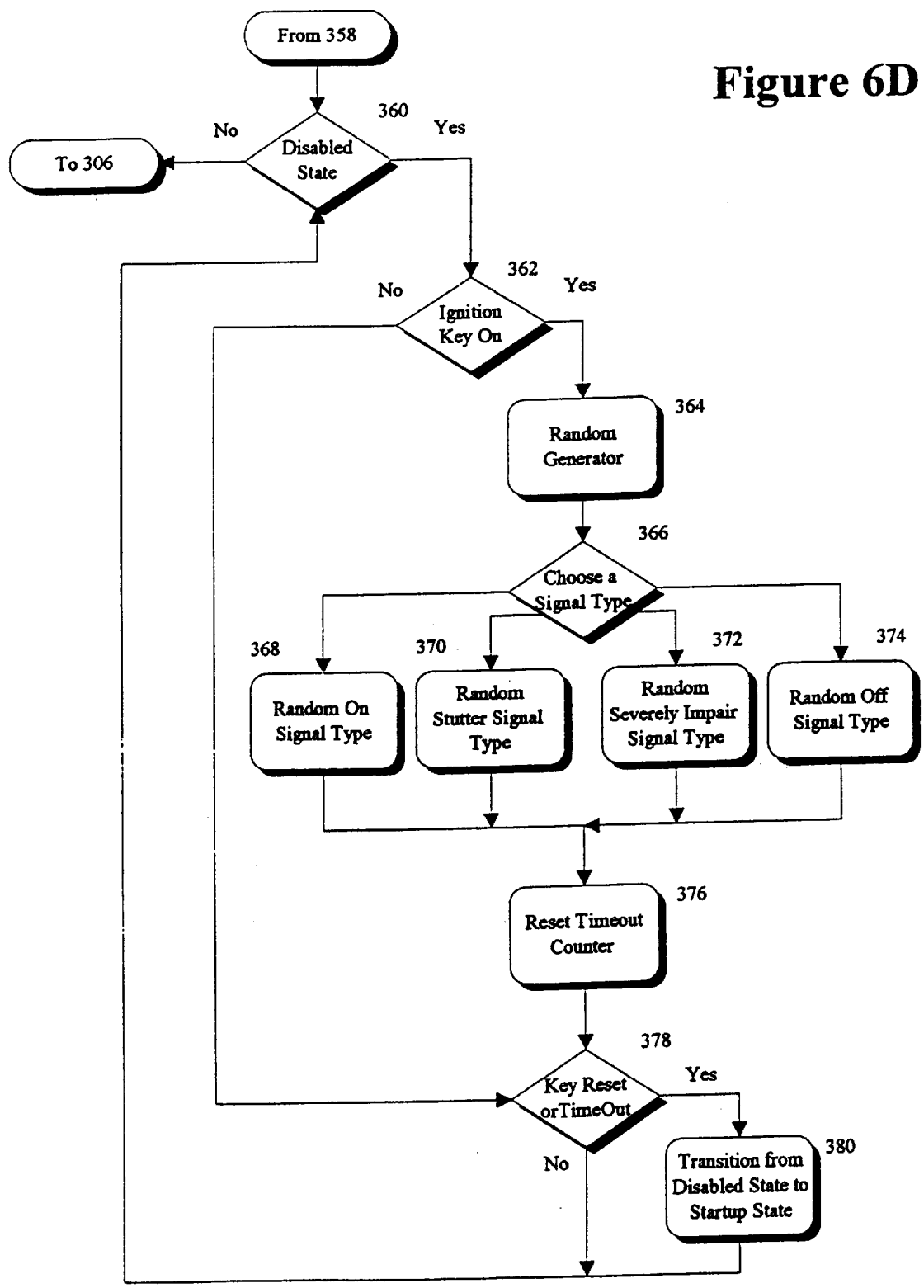
FIG. 6D is an expansion of the top level flow chart detailing the random problem simulation loop sequence.

If in step 326 the device was not in the enabled state, then at this point the system must be in the startup state, and step 350 determines if the random startup time has expired. This startup time is of a randomly chosen duration which is longer than a predetermined minimum and shorter than a predetermined maximum. If the startup time has expired, then step 352 switches the system to the disabled state and continues operation at step 354. In step 354 it is determined if the device is in the disabled state. If not, then step 356 insures that the output buffer, which contains the 3 kHz and 40 kHz modulation information, is coupled to the output groups 140 and 165, thereby communicating the enabled signal 210 to the interface circuits. Code execution then returns back to the beginning of the main loop in step 306. If the system is in the disabled state during step 354 then step 358 occurs, resulting in execution of the problem simulation routine, which is detailed in FIG. 6D.

Once the system reaches the disabled state, it remains in this subloop section of code and does not return to the main loop until a time-out or reset sequence occurs. Step 360 determines if the system has been returned to the startup state. If not, then step 362 checks the ignition switch 120. If the switch is still in the ON position, then step 364 generates a random number. Considering this random number and the weights associated with the probability of each occurring, step 366 transfers control to one of steps 368 to 374 for implementation of the problem simulation. If by chance step 368 is chosen, a random number is generated to determine the duration of the run signal type 215, which effectively allows operation of the vehicle subsystems under control. This random duration lies between a predetermined minimum and maximum. If by chance step 370 is chosen, a random number is generated (between a predetermined minimum and maximum) to determine the number of stutter cycles that should occur during the stutter signal type 220. These cycles consist of either a random duration on period or a random duration period of repetitive oscillations consisting of 25 milliseconds on and 50 milliseconds off. This produces the effect of an impaired yet still operational vehicle subsystem, which in the case of the ignition subsystem results in very rough engine operation and significantly decreased horsepower. If by chance step 372 is chosen, a random number is generated (between a predetermined minimum and maximum) to determine the duration of the severely impaired signal type 225. This signal type consists of repetitive oscillations consisting of 25 milliseconds on and 175 milliseconds off. This produces the effect of a severely impaired vehicle subsystem, which in the case of the ignition subsystem results in no engine operation while still exhibiting occasional spark firing to indicate the potential for operation. If by chance step 374 is chosen, a random number is generated to determine the duration of the off signal type 230, which effectively allows no operation of the vehicle subsystems under control. This random duration lies between a predetermined minimum and maximum. Regardless of which problem simulation step occurred in steps 368 through 374, code execution resumes at step 376. This step resets the time-out interval counter that is constantly being updated by the interrupt routine. This ensures that a time-out will not occur until the ignition switch 120 is in the OFF position for the entire duration of the time-out interval. If in step 362 the ignition key 120 is in the OFF position, then control is transferred to step 378 and the time-out interval timer continues counting. Step 378 looks for either a reset sequence from the ignition switch 120 or the expiration of the predetermined time-out interval. This ignition switch reset sequence is defined as three ignition switch 120 ON/OFF cycles within a predetermined time period. If either of these conditions is met, then execution continues at step 380. The device transitions from the disabled state to the startup state and returns to step 360 where the startup state is found to exist, which then exits the problem simulation subloop and returns control to step 306 where the main loop begins again. If in step 378 neither condition is met, then control also returns to step 360 where the startup state is found to not exist, and therefore the problem simulation loop continues. This results in the problem simulation loop randomly chaining together the four problem simulation signal types with random time variations as long as the unauthorized user continues to attempt operation of the vehicle.

We claim:

1. An apparatus to prevent unauthorized operation of a motor vehicle by an operator through random problem simulation on at least one motor vehicle subsystem comprising:

input means to allow the motor vehicle operator to input operator identification;

verification means for interpreting operator identification to determine authorization of the motor vehicle operator;

random generator means for generating a random control information signal during unauthorized operation of the motor vehicle;

interface means for electromagnetically connecting said random generator means with the motor vehicle subsystem such that motor vehicle control is achieved;

said input means electromagnetically coupled to said verification means, said verification means electromagnetically coupled to said random generator means, said random generator means generating said random control information signal whenever the motor vehicle operator is not authorized, said interface means electromagnetically coupled between said random generator means and the motor vehicle subsystem such that said random control information signal is utilized to control the motor vehicle subsystem.

2. The apparatus of claim 1 wherein said random generator means comprises means for receiving a random radio frequency signal to provide said random control information signal.

3. The apparatus of claim 1 wherein said random generator means comprises digtal logic arranged in such order as to provide said random control information signal.

4. The apparatus of claim 1 wherein said random generator means comprises a microcontroller programmed to provide said random control information signal.

5. An apparatus to prevent unauthorized operation of a motor vehicle by an operator through random problem simulation on a plurality of motor vehicle subsystems comprising:

a plurality of input means to allow the motor vehicle operator to input operator identification;

verification means for interpreting operator identification to determine authorization of the motor vehicle operator;

random generator means for generating a plurality of random control information signals during unauthorized operation of the motor vehicle;

a plurality of interface means for electromagnetically coupling said random generator means with the plurality of motor vehicle subsystems such that motor vehicle control is achieved;

said plurality of input means electromagnetically coupled to said verification means, said verification means electromagnetically coupled to said random generator means, said random generator means generating said plurality of random control information signals whenever the motor vehicle operator is not authorized, said plurality of interface means electromagnetically coupled between said random generator means and said plurality of motor vehicle subsystems such that said plurality of random control information signals is utilized to control the plurality of motor vehicle subsystems.

6. The apparatus of claim 5 wherein said random generator means comprises means for receiving random radio frequency signals to provide said plurality of random control information signals.

7. The apparatus of claim 5 wherein said random generator means comprises digtal logic arranged in such order as to provide said plurality of random control information signals.

8. The apparatus of claim 5 wherein said random generator means comprises a microcontroller programmed to provide said plurality of random control information signals.

9. A method of preventing operation of a motor vehicle by an unauthorized operator, having means for determining when vehicle operation is attempted, an input circuit capable of allowing entry of operator identification, a verification circuit capable of determing if the operator is authorized to operate the motor vehicle during attempted vehicle operation, the input circuit and the verification circuit being capable of communicating with each other, a means for processing user features, a random generator circuit capable of generating a random control information signal, an interface circuit capable of controlling a motor vehicle subsystem, the random generator circuit and the interface circuit capable of communicating with each other, comprising the steps of.

a) initializing system variables;

b) checking for attempted vehicle operation, and if vehicle operation is occuring, then jumping to step (c), or if vehicle operation is not occuring, then jumping to step) (b);

c) determining authorization of operator input within the verification circuit, and if the operator input is authorized, then jumping to step (d), or if the operator input is not authorized, then jumping to step (e);

d) processing user features and jumping to step (j);

e) determining if a startup timer has expired, and if the startup timer has not expired then jumping to step (j), and if the startup timer has expired then continuing with step (f);

f) generating a random control information signal in the random generator circuit;

g) communicating the random control information signal to the interface circuit;

h) utilizing the random control information signal within the interface circuit to control the motor vehicle subsystem, thereby causing random problem simulation;

i) checking for conclusion of attempted unauthorized operation, and if attempted unauthorized operation has concluded then jumping to step (b), or if attempted unauthorized operation has not concluded then jumping to step (f);

j) allowing normal vehicle operation;

k) jumping to step (b).

10. The method of claim 9 wherein the random generator circuit is capable of providing run and off signal types, and wherein generating the random control information signal comprises the following additional steps for step (f):

f-1) selecting a signal type at random from the signal types of run and off;

f-2) selecting a random duration for the selected signal type;

f-3) performing the selected signal type for the selected duration.

11. The method of claim 10 wherein the random generator is additionally capable of providing stutter and severely impaired signal types, and wherein generating the random control information signal comprises replacing step (f-1) with the following step:

f-4) selecting a signal type at random from the signal types of run, stutter, severely impaired, and off.

12. The method of claim 9 wherein the input circuit is also capable of generating a security code, and the verification circuit is also capable of interpreting security codes, and wherein secured communication from the verifying circuit is added, comprising skipping step (c) and adding the following additional steps for step (c):

c-1) communicating a security code with the operator input;

c-2) verifying the correct security code is present within the verification circuit, and if the correct security code is present, then jumping to step (c-3), or if the correct security code is not present, then jumping to step (e).

c-3) determining authorization of operator input within the verification circuit, and if the operator is authorized, then jumping to step (j), or if the operator is not authorized, then continuing with step (e).

13. The method of claim 9 wherein the random generator circuit is also capable of generating a security code, and the interface circuit is also capable of interpreting security codes, and wherein secured communication with the interface circuit is added, comprising adding the following additional steps after step (g):

g-1) communicating a security code with the random control information signal;

g-2) verifying the correct security code is present at the interface circuit before any operation is allowed.

14. The method of claim 9 wherein an anti-hijacking mode is added by including an anti-hijacking circuit comprising an anti-hijacking flag, an anti-hijacking timer and an anti-hijacking input, and comprising the following step being added after step (j):

j-1) checking to determine if the anti-hijacking flag is set, and if the antihijacking flag is set, then jumping to step (j-2), or if the anti-hijacking flag is not set, then jumping to step (j-3);

j-2) checking to determine if the anti-hijacking timer has expired, and if the anti-hijacking timer has expired, then jumping to step (f), or if the anti-hijacking timer has not expired, then jumping to step (h);

j-3) checking to determine if the anti-hijacking input has occured, and if the anti-hijacking input has occured, then setting the anti-hijacking flag.

15. The method of claim 9 wherein a valet mode is added by including a valet circuit comprising a valet flag, a valet timer, and a valet input, and comprising adding the following step after step (a):

b-1) checking to determine if the valet flag has been set by a previous authorized operator, and if the valet flag has been set, then allowing valet operation to occur by jumping to step (j), or if the valet flag has not been set, then jumping to step (c);

and adding the following steps after step (j):

j-1) checking to determine if the valet flag is set, and if the valet flag is not set, then jumping to step (j-5), or if the valet flag is set, then jumping to step j-2);

j-2) checking to determine if the valet timer has expired, and if the valet timer has expired, then jumping to step (f), or if the valet timer has not expired, then jumping to step (j-3);

j-3) checking to determine if the valet input has occured, and if the valet input has occured, clearing the valet flag;

j-4) jumping to step (k);

j-5) checking to determine if the valet input has occured, and if the valet input has occured, setting the valet flag.

16. The method of claim 9 wherein a programming mode is added by including a programming circuit comprising a programming flag and a programming input, and comprising adding the following steps after step (j):

j-1) checking to determine if the programming input has occured, and if the programming input has occured, then setting the programming flag;

j-2) checking to determine if the programming flag is set, and if the programming flag is set, then jumping to step (j-3), or if the programming flag is not set, then jumping to step (k);

j-3) recording a new verification code.

* * * * *